July 14, 1925.
O. T. WAITE
PROCESS OF RUG MAKING AND RUGS
Filed July 28, 1923
1,545,536
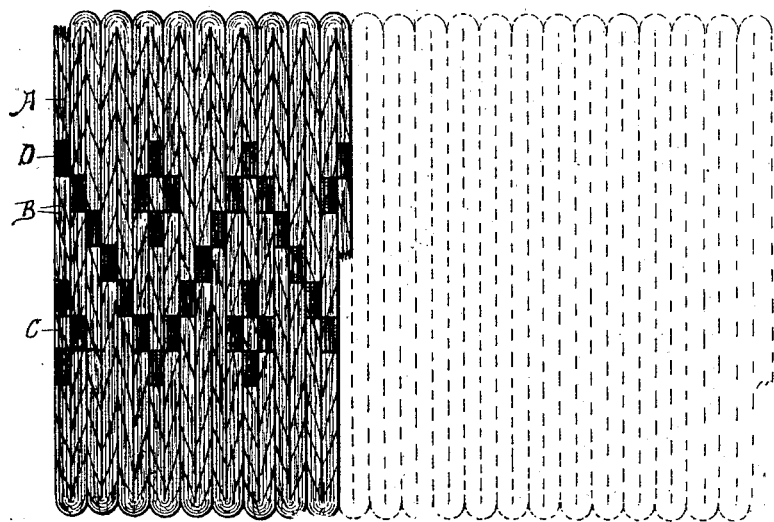
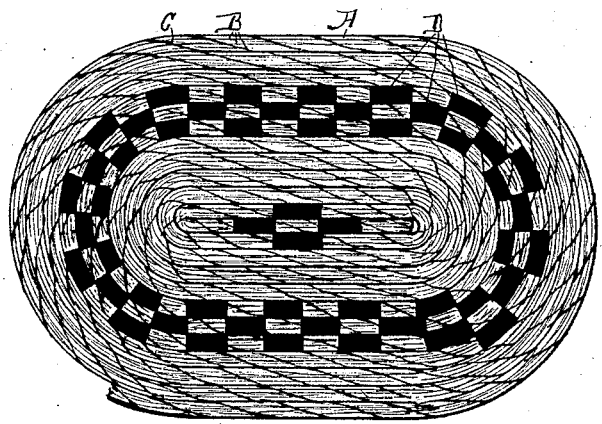
Inventor:
Ossian T. Waite
by Banning & Banning
Attys Patented July 14, 1925.

UNITED STATES PATENT OFFICE.

OSSIAN T. WAITE, OF OSHKOSH, WISCONSIN, ASSIGNOR TO WAITE GRASS CARPET COMPANY, OF OSHKOSH, WISCONSIN, A CORPORATION OF WISCONSIN.

PROCESS OF RUG MAKING AND RUGS.

Application filed July 28, 1923. Serial No. 654,375.

*To all whom it may concern:*

Be it known that I, OSSIAN T. WAITE, a citizen of the United States, residing at Oshkosh, in the county of Winnebago and State of Wisconsin, have invented certain new and useful Improvements in Processes of Rug Making and Rugs, of which the following is a specification.

This invention relates to the process of making rugs of that type which is made up by the use of a continuous strand which is either laid back and forth in continuous turns or spirally wound to build up the rug either in circular or oval formation. Rugs of this character at the present time are frequently formed either of grass strands or rag strands, as is well known in the art. If the rug be formed of a continuous grass strand, it is customary to decorate the rug by the application of a stencil design or pattern, and if the rug is formed of a rag strand, it is customary to give a variegated effect by forming the rag strand of rag strips in variegated colors. The method of stencilling a grass rug is not entirely satisfactory for all purposes in that it materially increases the cost of manufacture, and at the same time gives a somewhat sharp or mechanical pattern effect.

The object of the present invention is to build up a rug out of a continuous strand, preferably formed of straight laid lengths of wire grass of the character commonly used in the making of grass rugs, which strand has entered into it, at predetermined intervals, a series of sections of contrasting color so arranged and spaced that when the strand is formed into a rug, the colored sections will occupy predetermined positions and furnish the constituent portions of a definite design or pattern in contrasting colors against the ground furnished by the natural color of the grass.

In forming the grass strand, the contrasting color sections may be applied in any one of several ways. The preferred manner of forming the color sections is to introduce small sections of colored fabric at predetermined intervals into the grass strand, so that the fabric will be bound into and become a constituent part of the strand or twine.

The grass strand is preferably formed from straight laid lengths or wisps of grass in overlapping relation and bound around with a spirally laid wrapping thread, and in making the strand in this way, the color fabric sections may be easily introduced and wound in with the wisps of grass. If desired, the strand may be provided with color sections by means of a suitable printing or stencilling device which applies paint or pigment to the strand at stated intervals during its progress from the spinning machine. Other possible methods of applying the color to the strand at predetermined space intervals may be utilized to secure a like color effect and it is not the intention in the present instance to limit the method of attaining the result stated, unless so specified in the claim.

The resulting rug will display a design or decoration having somewhat roughly defined characteristics. It is not the intention in the present instance to build up designs having sharply defined characteristics, since more or less stretching of the strands in the rug weaving process is likely to occur which would render any exact aligning of the color sections difficult even if it were desirable to secure any sharp cut design effect. On the contrary, it is believed that in rugs of this character a somewhat rough or uneven design is preferable to a more deeply defined method of decoration, it being understood, however, that in applying the color sections to the strand the same will be spaced in ratio to a preconceived scheme of decoration, so that the decoration will not be merely a haphazard spacing of the color sections in the completed rug.

As illustrative of the invention:

Figure 1 shows a length of grass strand with color fabric sections introduced thereinto;

Fig. 2 is a view of a rug built up by a looping of the grass strand back and forth upon itself and displaying the features of the present invention; and Fig. 3 is a view of a spirally wound rug displaying the features of the present invention.

The strand is designated A and consists of straight laid lengths or wisps B of wire grass in overlapping relation and bound around by a spiral wrapping thread C with sections D of colored fabric introduced in the strand at the proper points to build up a pattern such as that shown in Figs. 2 and 3.

Although the invention has been defined as particularly adapted for the use in the making of rugs composed of a continuous strand of grass twine, it will be understood that the process above defined is applicable for use in connection with strands formed of material other than grass, and that it consists essentially in the application of contrasting patches of color introduced by suitable means into the strand in conformity with the preconceived scheme of decoration in the rug thereafter to be completed.

I claim:

The process of rug making which consists in forming a continuous strand of overlapping lengths of grass having at proper intervals patches of colored fabric introduced into the strand, the spacing of said patches being in conformity with a preconceived pattern, and thereafter in building up the rug to bring said patches into proper relation with one another to produce the intended pattern substantially as described.

OSSIAN T. WAITE.